(12) United States Patent
Fenton et al.

(10) Patent No.: US 7,171,650 B2
(45) Date of Patent: Jan. 30, 2007

(54) SYSTEM AND METHOD FOR INTEGRATING RESOURCES IN A NETWORK

(75) Inventors: Charles S. Fenton, Ypsilanti, MI (US); Ryan P. Harris, Ann Arbor, MI (US)

(73) Assignee: SBC Properties, L.P., Reno, NV (US)

( * ) Notice: Subject to any disclaimer, the term of this patent is extended or adjusted under 35 U.S.C. 154(b) by 693 days.

(21) Appl. No.: 10/226,863

(22) Filed: Aug. 23, 2002

(65) Prior Publication Data

US 2004/0040030 A1   Feb. 26, 2004

(51) Int. Cl.
*G06F 9/44* (2006.01)
*G06F 13/00* (2006.01)

(52) U.S. Cl. .............. 717/120; 717/115; 717/118; 719/316; 719/320; 719/328

(58) Field of Classification Search ......... 717/115, 717/102, 116, 118, 120, 139, 140, 148; 719/320, 719/313, 314, 315, 316, 330, 328
See application file for complete search history.

(56) References Cited

U.S. PATENT DOCUMENTS

| | | | | |
|---|---|---|---|---|
| 6,298,481 | B1 | 10/2001 | Kosaka et al. | 717/110 |
| 6,304,893 | B1 | 10/2001 | Gish | 709/203 |
| 6,311,320 | B1 | 10/2001 | Jibbe | 717/111 |
| 6,405,364 | B1 | 6/2002 | Bowman-Amuah | 717/101 |
| 6,523,027 | B1 * | 2/2003 | Underwood | 707/4 |
| 2003/0051066 | A1 * | 3/2003 | Pace et al. | 709/316 |
| 2003/0195997 | A1 * | 10/2003 | Ibert et al. | 709/318 |

FOREIGN PATENT DOCUMENTS

WO   WO 98/41912   9/1998

OTHER PUBLICATIONS

Carriglearning, Accessing Database Using JDBC, 2001.*
Cliff Berg, The State of JAVA Application Middleware, Part 1, Mar. 1999, JAVAWorld.*
Cliff Berg, The State of JAVA Middleware, Part 2: Enterprise JAVABeans, Apr. 1999, JAVAWorld.*
Dick Reinshagen, Connect the Enterprise with the JCA, Part 1, Nov. 2001, JAVAWorld.*
Dick Reinshagen, Connect the Enterprise with the JCA, Part 2, Nov. 2001, JAVAWorld.*

(Continued)

*Primary Examiner*—Antony Nguyen-Ba
(74) *Attorney, Agent, or Firm*—Baker Botts L.L.P.

(57) ABSTRACT

A method for integrating a resource in a network includes receiving at a first adapter a command associated with a function to be performed by a resource. The method also includes receiving a first script associated with the command, and interpreting the first script to produce one or more first byte codes. The method further includes causing a second adapter to receive a second script. The second adapter is operable to interpret the second script into one or more second byte codes. In addition, the method includes executing the one or more first byte codes, and invoking execution of the one or more second byte codes at the second adapter. The execution of the byte codes at the first and second adapters is operable to invoke the function in and facilitate communication with the resource.

39 Claims, 4 Drawing Sheets

OTHER PUBLICATIONS

Abraham Kang, Enterprise Application Integration Using J2EE, Aug. 2002, JAVAWorld.*

Pimm Fox, "Tools for J2EE Management Come of Age," ComputerWorld, 2 pages, Jul. 1, 2002.

Carol Sliwa, "Vendors try to simplify J2EE," ComputerWorld, 3 pages, Oct. 7, 2002.

Khawar Ahmed, "J2EE Development with Rational XDE and IBM WebSphere Studio Application Developer," http://www.rational.com/media/whitepapers/tp197a.pdf, 16 pages, Jun. 2002.

Steve Demuth, "Bringing J2EE into your Established (Slightly Hidebound) Organization," http://www.artemisalliance.com/files/bringing_j2ee_into_organization.pdf, 26 pages, Last modified Aug. 14, 2002.

Alex Martelli, "The Best Gets Better," Linux Magazine, http://www.linux-mag.com/cgi-bin/printer.pl?issue=2002-07&article=python, 9 pages, Jul. 2002.

Daniel Michalik, http://mail.python.org/pipermail/jpython-interest/2001-March/004371.html, 1 page, Mar. 12, 2001.

* cited by examiner

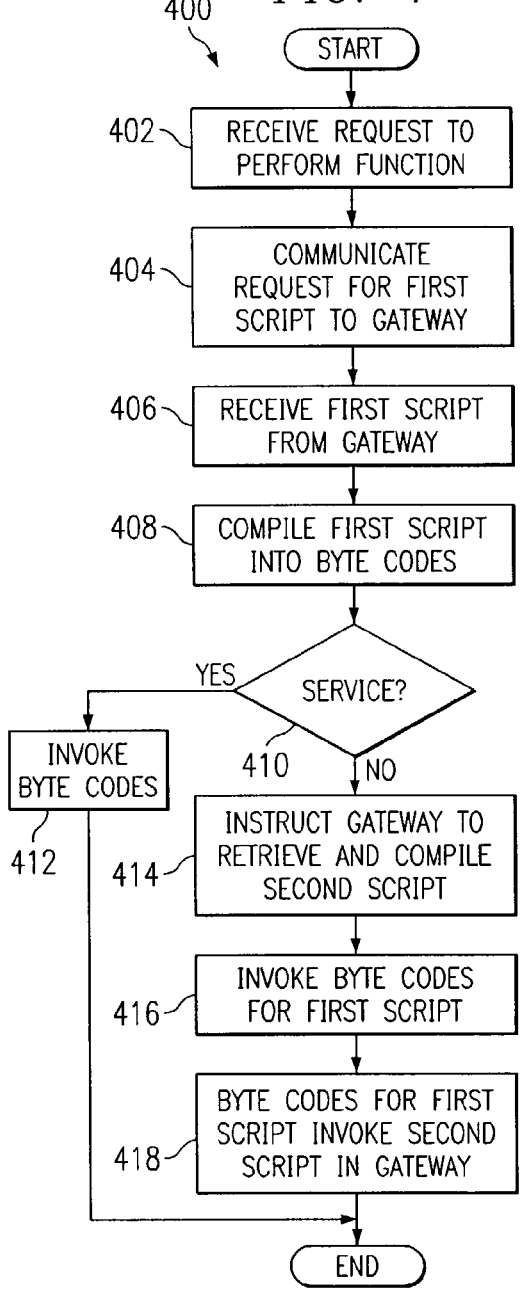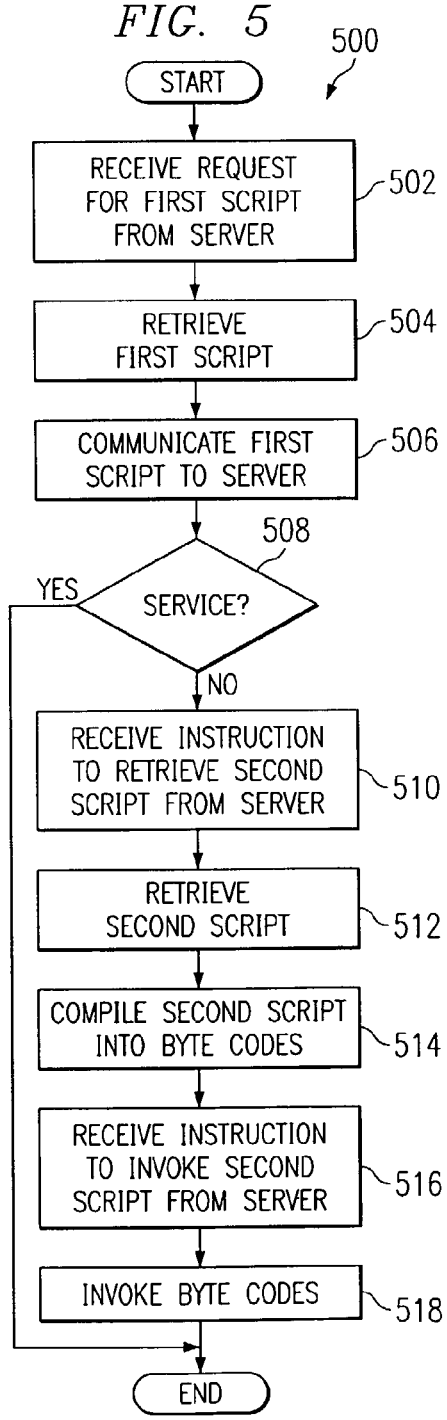

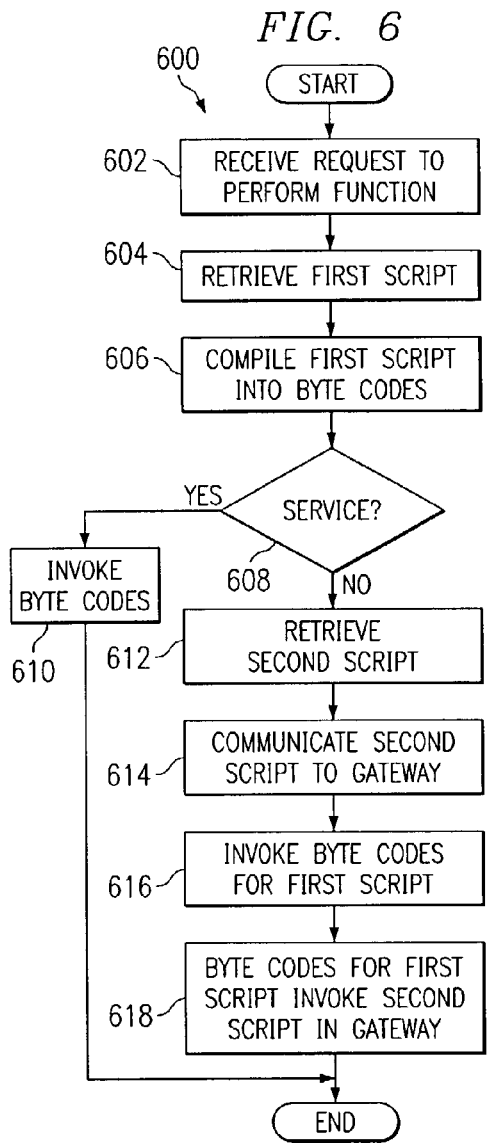
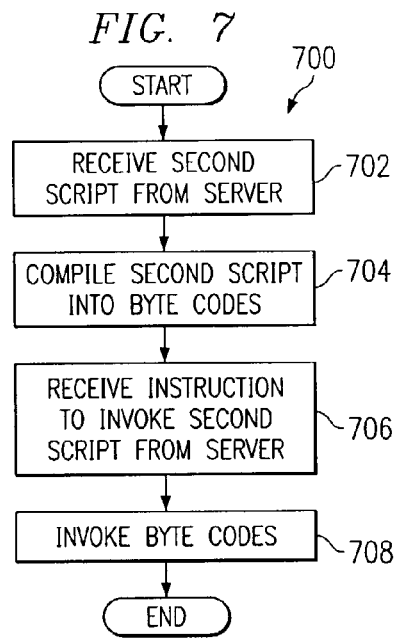
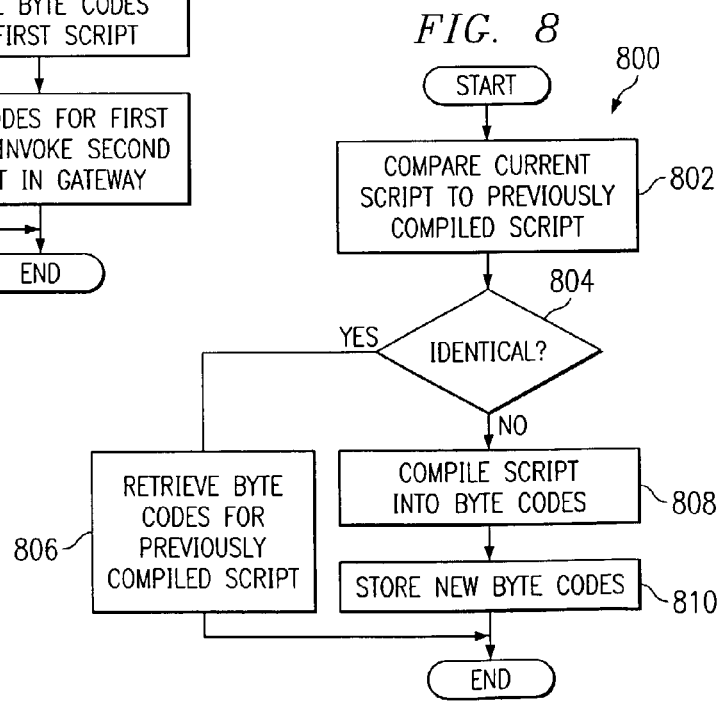

SYSTEM AND METHOD FOR INTEGRATING RESOURCES IN A NETWORK

TECHNICAL FIELD

This disclosure relates generally to the field of computer systems, and more particularly to a system, a method, and a program product for integrating resources in a network.

BACKGROUND

Integration adapters typically allow a new product to be installed in and work with existing or legacy computing systems. Each adapter typically allows the new product to communicate using the appropriate protocols and formats supported by a particular computing system. In general, providing more adapters typically increases the number of computing systems that the new product can work with, which also increases the number of potential customers for the new product. An integration adapter is often created by a skilled programmer who follows the software development cycle. The software development cycle typically includes steps for designing a software program, writing software code, compiling the code, building an executable program, deploying the executable program, and testing or debugging the executable program. This often can be a time consuming task.

BRIEF DESCRIPTION OF THE DRAWINGS

For a more complete understanding of this disclosure, reference is now made to the following descriptions, taken in conjunction with the accompanying drawings, in which:

FIG. 4 illustrates an example method for integrating a resource at a first adapter;

FIG. 5 illustrates an example method for integrating a resource at a second adapter;

FIG. 6 illustrates another example method for integrating a resource at a first adapter;

FIG. 7 illustrates another example method for integrating a resource at a second adapter; and FIG. 8 illustrates an example method for persisting scripts in a database.

DETAILED DESCRIPTION OF EXAMPLE EMBODIMENTS

Figure 1:
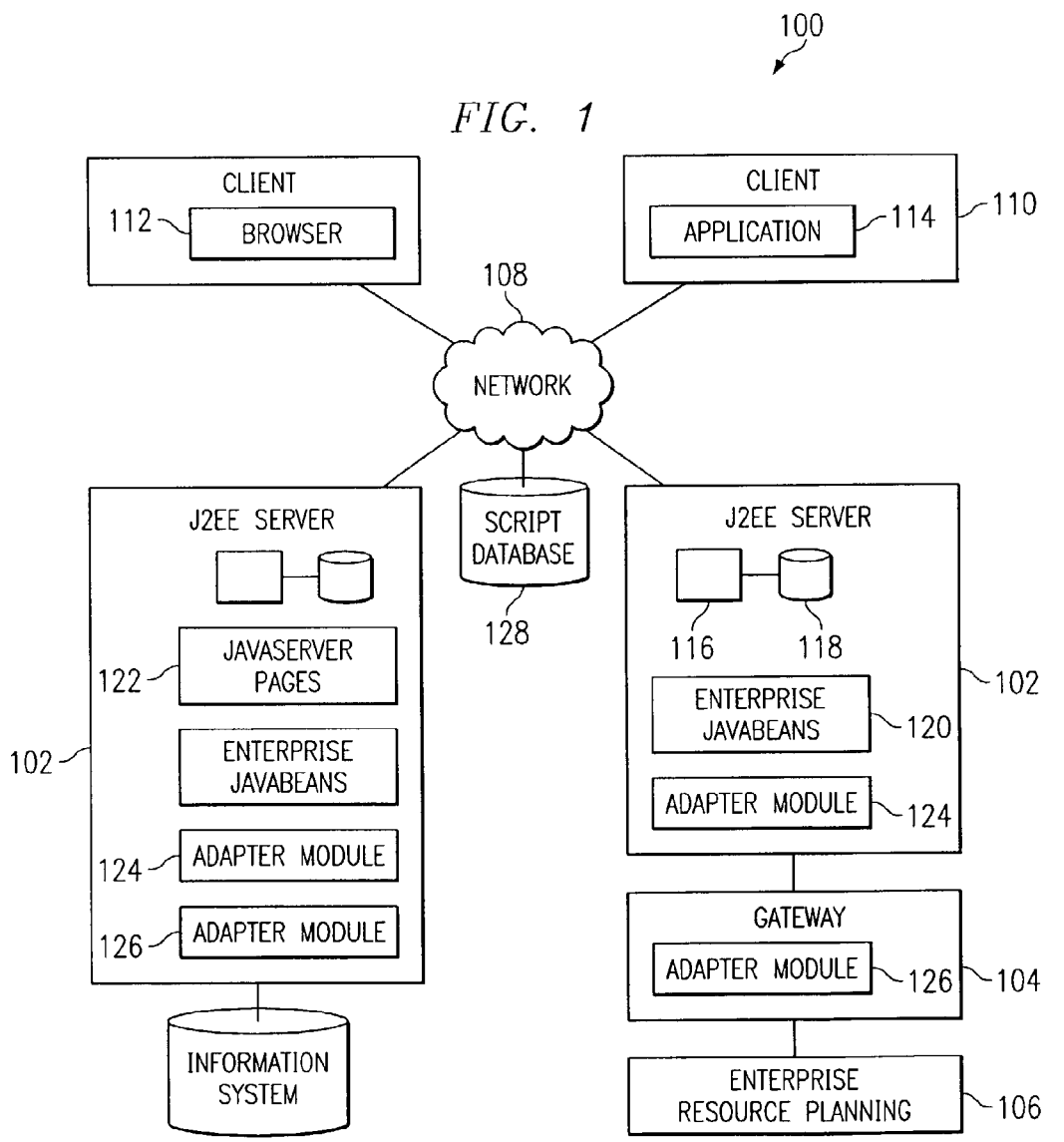
FIG. 1 illustrates an example system for integrating a resource in a network.

FIG. 1 illustrates an example system 100 for integrating a resource in a network. In the illustrated embodiment, system 100 includes servers 102, a gateway 104, resources 106, a network 108, and clients 110. Other embodiments of system 100 may be used without departing from the scope of this disclosure.

In one aspect of operation, server 102 and/or gateway 104 include adapter modules 124, 126, which help to integrate a resource 106 into system 100. The resource 106 may be a computing system or a device. Adapter modules 124, 126 integrate the resource 106 by collectively executing scripts, which define the function or functions to be performed by server 102 and/or gateway 104. Adapter modules 124, 126 can also transfer or marshal data between the executing scripts. The executing scripts cause server 102 and/or gateway 104 to behave as an adapter. For example, the scripts may act to translate data so that server 102 can communicate with the resource 106, even when they use different protocols and formats. Adapter module 124 could also individually execute a script to provide a service in system 100. For example, the script may cause server 102 to analyze data for a specific condition and invoke the execution of another script if the condition is met.

In the illustrated embodiment, server 102 is coupled to network 108. Server 102 could also be coupled to gateway 104. In this specification, the term "couple" refers to any direct or indirect communication between two or more components, whether or not those components are in physical contact with one another. Also, the term "communication" refers to communication between physically separate components or between components within a single physical unit. Server 102 performs one or more functions to integrate a resource 106 in system 100. Server 102 may include any hardware, software, firmware, or combination thereof operable to perform integration functions in system 100.

Gateway 104 is coupled to server 102 and to a resource 106. Gateway 104 facilitates access to the resource 106. For example, gateway 104 may communicate with server 102 and exchange information with resource 106. Gateway 104 may comprise any hardware, software, firmware, or combination thereof operable to provide access to a device or system being integrated. The use of gateway 104 may or may not be required to access a resource 106 in system 100. As shown in FIG. 1, a gateway 104 could be used to integrate some resources 106 but not other resources 106.

Resource 106 represents a computing device or system being integrated into system 100 by server 102 and/or gateway 104. Resource 106 may represent any suitable system or device. In the illustrated example, resource 106 represents a database information system or an enterprise resource planning (ERP) system. Other suitable resources, such as transaction processing systems, could also be used and integrated into system 100.

Network 108 is coupled to server 102 and clients 110. Network 108 facilitates communication between components of system 100. For example, network 108 may communicate Internet Protocol (IP) packets, frame relay frames, Asynchronous Transfer Mode (ATM) cells, or other suitable information between network addresses. Network 108 may include one or more local area networks (LANs), metropolitan area networks (MANs), wide area networks (WANs), all or a portion of a global network such as the Internet, or any other communication system or systems at one or more locations.

Client 110 is coupled to network 108. Client 110 may perform any of a variety of functions in system 100. For example, client 110 may communicate with server 102 and submit a request to perform a function in resource 106. Server 102 and/or gateway 104 act as an adapter so that the requested function can be invoked and performed in the resource 106. Client 110 accesses server 102 using a browser 112, a client application 114, or in any other suitable manner. Client 110 may include any hardware, software, firmware, or combination thereof operable to communicate with server 102.

In the illustrated example, server 102 includes a processor 116 and a memory 118. Processor 116 executes instructions and manipulates data to perform the operations of server 102. Although FIG. 1 illustrates a single processor 116 in server 102, multiple processors 116 may be used according to particular needs. Memory 118 stores and facilitates retrieval of information used by processor 116 to perform the functions of server 102. Memory 118 may, for example, store instructions to be performed by processor 116 and data used by processor 116. Memory 118 may include any hardware, software, firmware, or combination thereof operable to store and facilitate retrieval of information.

In the illustrated example, server 102 comprises a JAVA 2 Platform Enterprise Edition (J2EE™) server. In this example embodiment, server 102 includes one or more Enterprise JAVABEANS 120. Server 102 may also include one or more JAVASERVER Pages (JSP™) servlets 122. FIG. 1 illustrates only example embodiments of server 102, and server 102 could represent any other suitable platform. For example, other protocols that support the use of JAVA objects or other objects can be used in system 100.

JAVABEANS 120 represent JAVA applications that implement business or other logic in system 100. Any type of logic may be implemented in JAVABEANS 120 to perform any suitable function. For example, the logic implemented in JAVABEANS 120 may allow a user using a client 110 to order products from different vendors. In this example, JAVABEANS 120 may submit product orders to the resources 106, which represent the vendors' order processing systems. The logic implemented in JAVABEANS 120 may also allow a user using client 110 to track shipments being handled by various shipping carriers. In that case, JAVABEANS 120 may retrieve information about specific shipments from the resources 106, which represent the carriers' tracking systems. Other or additional JAVABEANS 120 could be used in system 100.

JAVABEANS 120 can be invoked directly from a client 110 using client application 114. JAVABEANS 120 could also be invoked from a client 110 using a browser 112, where server 102 uses one or more JSP servlets 122 to generate web pages that can be displayed to a user at client 110. The user may then invoke a function of server 102, such as by initiating execution of a JAVABEAN 120, using the web page.

To facilitate integration of a resource 106 into system 100, server 102 includes an adapter module 124, and server 102 or gateway 104 includes an adapter module 126. Adapter modules 124, 126 may each receive one or more scripts, such as by retrieving scripts stored in a database 128. The scripts identify the actions to be performed by adapter modules 124, 126. In particular, the scripts identify how adapter modules 124, 126 operate in order to integrate a resource 106 with server 102.

Adapter modules 124, 126 compile or interpret the scripts into byte codes and execute the byte codes. Adapter modules 124, 126 may further communicate with one another and exchange information during the execution of the scripts. By executing the scripts and exchanging information, adapter modules 124, 126 may allow information, such as function invocations and status messages, to be communicated between server 102 and resource 106. Adapter module 124 could also individually execute a script to perform a function in server 102, such as analyzing data. Adapter modules 124, 126 may each comprise any hardware, software, firmware, or combination thereof operable to execute scripts.

In one embodiment, adapter modules 124, 126 represent JAVA applications that run on or under one or more JAVA Virtual Machines (JVM™). In a particular embodiment, adapter module 124 executes in a (J2EE™) container, and adapter module 126 is not contained in a (J2EE™) container. In this embodiment, adapter module 124 may communicate with adapter module 126 using at least one of the Remote Method Invocation (RMI), JAVA Messaging Service (JMS™), and JAVA Data Base Connection (JDBC™) mechanisms. Because adapter module 124 may only be able to communicate using a mechanism defined in the (J2EE™) standard, adapter module 124 may be unable to communicate directly with the resource 106 being integrated. Adapter module 126 can communicate using any or all of the (J2EE™) mechanisms, plus any other communication mechanism suitable for communicating with a resource 106 being integrated. Because adapter module 126 may not be limited to communicating using a (J2EE™) mechanism, adapter module 126 may communicate with the resource 106 being integrated. Adapter modules 124, 126 may also communicate with one another using a (J2EE™) mechanism and exchange information so that the resource 106 is integrated into system 100.

As a particular example, resource 106 may represent a directory-based file system. In the (J2EE™) environment, the RMI, JMS, and JDBC mechanisms may not support a facility that allows server 102 to access files on the directory. Adapter modules 124, 126 execute scripts to allow server 102 to read information from or write information to a file in the directory. For example, adapter module 126 may not be restricted to communicating using (J2EE™) mechanisms, so adapter module 126 could access files on the directory. Adapter module 124 could communicate with adapter module 126 and inform adapter module 126 of what information should be read from or written to resource 106. If writing information to the directory, adapter module 124 could communicate the information to adapter module 126 using one or more of the (J2EE™) communication mechanisms. Similarly, if reading information from the directory, adapter module 126 could make the information available to adapter module 124 using one or more of the (J2EE™) communication mechanisms.

Although FIG. 1 illustrates one example of a system 100 for integrating a resource in a network, various changes may be made to system 100. For example, while FIG. 1 illustrates the use of a (J2EE™) server 102, other suitable servers may be used.

Figure 2:
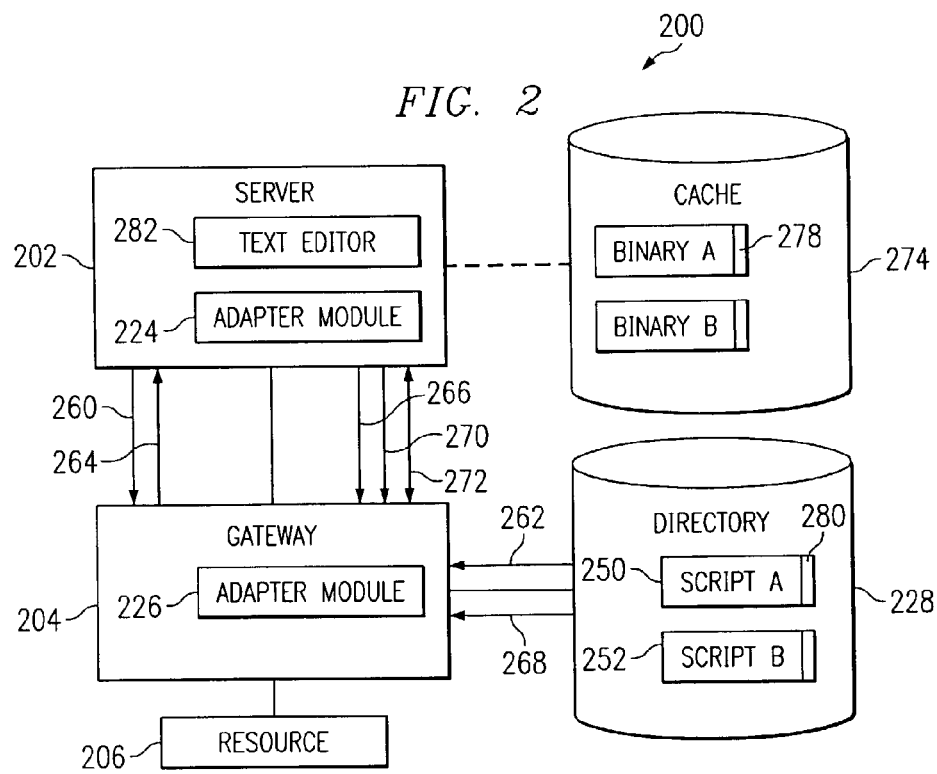
FIG. 2 illustrates an example data flow for integrating a resource in a network.

FIG. 2 illustrates an example data flow 200 for integrating a resource in a network. While FIG. 2 assumes that a server 202 and a gateway 204 are collectively used to integrate a resource 206, the functionality described with respect to gateway 204 could be implemented in server 202.

In FIG. 2, server 202 includes an adapter module 224, and gateway 204 includes an adapter module 226. Server 202 could represent any suitable computing device, such as a (J2EE™) server, and gateway 204 could represent any suitable gateway device.

In this example, gateway 204 has access to a script directory 228. Script directory 228 may include any hardware, software, firmware, or combination thereof operable to store and facilitate retrieval of information. Also, script directory 228 may use any of a variety of data structures, arrangements, or compilations to store and facilitate retrieval of the information.

In the illustrated example, script directory 228 stores scripts 250, 252. Scripts 250, 252 represent scripts that can be compiled/interpreted and executed by adapter modules 224, 226. Scripts 250, 252 may represent source JYTHON or PYTHON scripts, a script library, a JAVA class, or any other suitable structure containing one or more scripts. The scripts 250, 252 facilitate integration of and communication with a resource 206, such as by converting data from a protocol used by server 202 to a protocol used by resource 206. Script 250 could represent a script executed by adapter module 224, and script 252 could represent a script executed by adapter module 226.

Adapter modules 224, 226 could represent any suitable element for compiling/interpreting and executing scripts. In one embodiment, adapter module 224 may represent a JAVABEANS component that conforms to JAVA container boundaries, while adapter module 226 is not contained in a JAVA container. In this embodiment, each adapter module 224, 226 is associated with one or more JAVABEAN properties. In a particular embodiment, the properties of an adapter module 224, 226 identify the location of script directory 228 and the script 250, 252 associated with that adapter 224, 226.

In one aspect of operation, adapter module 224 may execute a script 250 to provide a service. For example, adapter module 224 may receive a request to perform a function, such as by receiving a command from an Enterprise JAVABEAN 120 of FIG. 1 to analyze data and determine if a condition is satisfied. Adapter module 224 communicates a message 260 to adapter module 226, which instructs adapter module 226 to retrieve script 250 from directory 228. Adapter module 226 retrieves script 250 (represented as data flow 262) and communicates script 250 to adapter module 224 (represented as data flow 264). Adapter module 224 receives, compiles or interprets, and executes script 250. The script 250 causes adapter module 224 to analyze the data and determine if the condition is satisfied.

In another aspect of operation, adapter modules 224, 226 may execute scripts 250, 252 to act as an adapter. For example, adapter module 224 may receive a request to provide adapter functionality, such as by receiving a command from an Enterprise JAVABEAN 120 to invoke a function in resource 206. Adapter module 224 communicates message 260 to adapter module 226, causing adapter module 226 to retrieve and provide script 250 to adapter module 224. Adapter module 224 also communicates a message 266 to adapter module 226. Message 266 instructs adapter module 226 to retrieve script 252 (represented as data flow 268) and compile/interpret script 252. Server 202 can execute script 250, and the execution of script 250 may generate a message 270 that invokes the execution of script 252 in gateway 204. Server 202 and gateway 204 can also marshal or transfer data between the executing scripts 250, 252 (represented as data flows 272). By executing the scripts 250, 252 and exchanging data, server 202 and gateway 204 may act as an integration adapter and facilitate communication between server 202 and resource 206.

The messages 260, 266, 270 that cause adapter module 226 to retrieve scripts 250, 252 may represent any suitable type of instruction. For example, messages 260, 266, 270 could represent RMI calls, JMS messages, or other suitable messages.

In a particular embodiment, message 260 represents a RMI import command, message 266 represents a RMI proxy import command, and message 270 represents a RMI proxy invocation command. A proxy import makes the properties, functions, and classes of script 252 available for use by script 250. A proxy invocation command invokes the script 252 that was previously imported by a proxy command. In addition, server 202 and gateway 204 can marshal data between one another in the form of properties, function/method arguments, return values, or other suitable information.

In addition to directory 228, server 202 could also have access to a script cache 274. Cache 274 stores binary (compiled) versions of scripts 250, 252. In one embodiment, a marker 278 associated with the binary version of a script 250, 252 is compared with a marker 280 associated with the script 250, 252. As an example, the markers 278, 280 may represent date-time stamps. If the markers 278, 280 are the same, server 202 or gateway 204 may use the binary version of the script 250, 252. Otherwise, server 202 or gateway 204 retrieves and compiles/interprets the script 250, 252. Caching binary versions of scripts 250, 252 may help to speed the operation of server 202 and gateway 204 by reducing the need to compile or interpret scripts 250, 252 each time they are used.

In another embodiment, cache 274 may be used in place of directory 228. For example, cache 274 could be used when scripts 250, 252 are being developed. Cache 274 would store the latest versions of scripts 250, 252 in binary form. After development is complete, the binary forms of scripts 250, 252 can be made available, while the source scripts 250, 252 are not. This could help to protect the source scripts 250, 252 from being modified after development is complete.

The use of scripts 250, 252 may help to simplify the development of an adapter for resource 206. For example, rather than requiring that an adapter be developed in a complex programming environment by an experienced programmer, scripts 250, 252 could be written in a scripting language such as JYTHON or PYTHON using a text editor 282. The scripts 250, 252 could also be developed using a shorter development cycle. For example, a developer could design, write, and test/debug the scripts 250, 252 without the need to perform the other steps of the software development cycle.

Although FIG. 2 illustrates one example of a data flow 200 for integrating a resource in a network, various changes may be made to FIG. 2. For example, gateway 204 could be coupled to any number of resources 206. Also, any suitable type of messages 260, 264, 266, 270 could be used. In addition, scripts 250, 252 in directory 228 need not include markers 280, and cache 274 need not be included.

Figure 3:
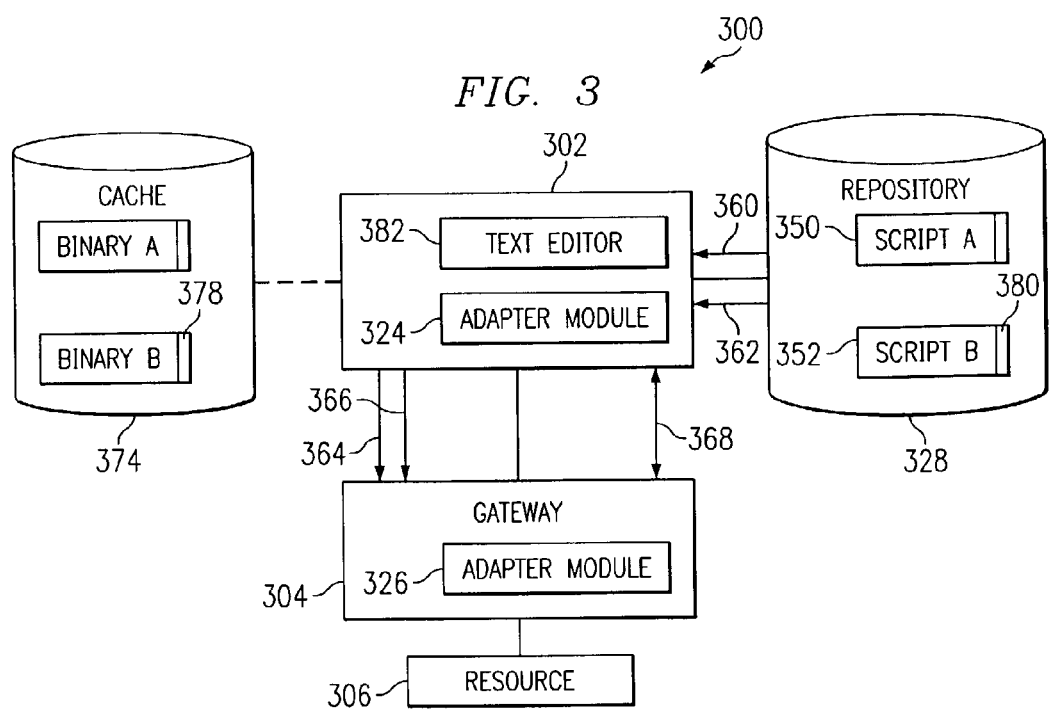
FIG. 3 illustrates another example data flow for integrating a resource in a network.

FIG. 3 illustrates another example data flow 300 for integrating a resource in a network. While FIG. 3 assumes that a server 302 and a gateway 304 are collectively used to integrate a resource 306, the functionality described with respect to gateway 304 could be implemented in server 302.

In FIG. 3, server 302 includes an adapter module 324, and gateway 304 includes an adapter module 326. Server 302 and gateway 304 may be the same as or similar to server 202 and gateway 204 of FIG. 2. In this example, server 302 has access to a script repository 328, which stores scripts 350, 352.

In one aspect of operation, adapter module 324 may execute a script 350 to provide a service. In this embodiment, adapter module 324 may retrieve script 350 from repository 328 (represented as data flow 360). Adapter module 324 then compiles or interprets and executes script 350. The script 350 causes adapter module 324 to perform the function and provide the service.

In another aspect of operation, adapter modules 324, 326 may execute scripts 350, 352 to act as an adapter. Adapter module 324 retrieves and compiles/interprets script 350. Adapter module 324 also retrieves script 352 from repository 328 (represented as data flow 362) and communicates the script 352 to adapter module 326 using message 364. Message 364 may, for example, represent a RMI proxy import command. Adapter module 326 can then compile/interpret script 352. Adapter module 324 executes script 350, and during execution adapter module 324 communicates message 366 to invoke the execution of script 352 in gateway 304. Server 302 and gateway 304 can also marshal or transfer data between one another (represented as data flows 368).

In addition to or in place of repository 328, server 302 could have access to a script cache 374. Cache 374 stores binary versions of scripts 350, 352. Server 302 may use markers 378, 380 in the same or similar manner as described with respect to server 202 of FIG. 2.

Although FIG. 3 illustrates another example of a data flow 300 for integrating a resource in a network, various changes may be made to FIG. 3. For example, gateway 304 could be coupled to any number of resources 306. Also, any suitable type of messages 364, 366 could be used. In addition, scripts 350, 352 in repository 328 need not include markers 380, and cache 374 need not be included.

FIG. 4 illustrates an example method 400 for integrating a resource at a first adapter. Method 400 may be described with respect to server 202 of FIG. 2. Method 400 could also be used by another device or devices in another system.

Server 202 receives a request to perform a function at step 402. This may include, for example, adapter module 224 receiving a command from an Enterprise JAVABEAN or another component. The request could include a command to perform a particular service, a command to act as an adapter for a resource 206, or other suitable request.

Server 202 communicates a request for a first script 250 to a gateway 204 at step 404. This may include, for example, adapter module 224 communicating a RMI import command to adapter module 226 in gateway 204. Server 202 receives the first script 250 from gateway 204 at step 406. This may include, for example, adapter module 226 retrieving the script 250 from directory 228 and communicating the script 250 to adapter module 224. Server 202 compiles/interprets the first script 250 at step 408. This may include, for example, adapter module 224 interpreting a JYTHON script 250 into JAVA byte codes.

If the request received at step 402 represents a request for a service, server 202 invokes the compiled/interpreted script 250 at step 412. This may include, for example, adapter module 224 executing the JAVA byte codes generated at step 408. Otherwise, the request represents a request to act as an adapter. Server 202 instructs gateway 204 to retrieve and compile/interpret a second script 252 at step 414. This may include, for example, adapter module 224 communicating a proxy import command to adapter module 226. This may also include adapter module 226 retrieving the second script 252 from directory 228 and compiling/interpreting the script 252. Server 202 invokes the first script 250 at step 416. The execution of the first script 250 invokes execution of the second script 252 in gateway 204 at step 418. This may include, for example, adapter module 224 communicating a proxy invocation command to adapter module 226. At this point, the executing scripts 250, 252 may exchange information to act as an adapter to integrate a resource 206.

Although FIG. 4 illustrates one example of a method 400 for integrating a resource at a first adapter, various changes may be made to FIG. 4. For example, while FIG. 4 assumes that a server 202 and a gateway 204 are collectively used to integrate a resource 206, the functionality described with respect to gateway 204 could be implemented in server 202.

FIG. 5 illustrates an example method 500 for integrating a resource at a second adapter. Method 500 may be described with respect to gateway 204 of FIG. 2. Method 500 could also be used by another device or devices in another system.

Gateway 204 receives a request for a first script 250 at step 502. This may include, for example, adapter module 226 receiving an import command from adapter module 224 in server 202. Gateway 204 retrieves the first script 250 at step 504. This may include, for example, adapter module 226 accessing directory 228 and retrieving the script 250 from directory 228. Gateway 204 communicates the first script 250 to server 202 at step 506. This may include, for example, adapter module 226 communicating the script 250 to adapter module 224 of server 202.

If the script 250 is being used by server 202 to perform a service, method 500 ends. Server 202 may provide the service without further interactions with gateway 204. Otherwise, server 202 and gateway 204 may act as an adapter. Gateway 204 receives an instruction to retrieve a second script 252 at step 510. This may include, for example, adapter module 226 receiving a proxy import command from adapter module 224. Gateway 204 retrieves the second script 252 at step 512. This may include, for example, adapter module 226 accessing directory 228 and retrieving the script 252 from directory 228. Gateway 204 compiles/interprets the second script 252 at step 514. This may include, for example, adapter module 226 interpreting a Jython script 252 into JAVA byte codes. Gateway 204 receives an instruction to invoke the second script 252 at step 516. This may include, for example, adapter module 226 receiving a proxy invocation command from adapter module 224. Gateway 204 invokes the second script 252 at step 518. This may include, for example, adapter module 226 executing the JAVA byte codes generated at step 514. At this point, the executing scripts 250, 252 may exchange information to act as an adapter to integrate a resource 206.

Although FIG. 5 illustrates one example of a method 500 for integrating a resource at a second adapter, various changes may be made to FIG. 5. For example, while FIG. 5 assumes that a server 202 and a gateway 204 are collectively used to integrate a resource 206, the functionality described with respect to gateway 204 could be implemented in server 202.

FIG. 6 illustrates another example method 600 for integrating a resource at a first adapter. Method 600 may be described with respect to server 302 of FIG. 3. Method 600 could also be used by another device or devices in another system.

Server 302 receives a request to perform a function at step 602, such as a request from an Enterprise JAVABEAN or other component. Server 302 retrieves the first script 350 at step 604. This may include, for example, adapter module 324 retrieving the first script 350 from a script repository 328. Server 302 compiles/interprets the first script 350 at step 606.

If the request received at step 602 represents a request for a service at step 608, server 302 invokes the compiled/interpreted script 350 at step 610. Otherwise, the request may represent a request to act as an adapter. Server 302 retrieves a second script 352 at step 612. This may include, for example, adapter module 324 retrieving the second script 352 from repository 328. Server 302 communicates the second script 352 to gateway 304 at step 614. This may include, for example, adapter module 324 communicating the second script 352 to adapter module 326 using a proxy import command. This may also include adapter module 326 compiling/interpreting the second script 354. Server 302 invokes the first script 350 at step 616. The execution of the first script 350 invokes execution of the second script 352 in gateway 304 at step 618. This may include, for example, adapter module 324 communicating a proxy invocation command to adapter module 326. At this point, the executing scripts 350, 352 may exchange information to act as an adapter to integrate a resource 306.

Although FIG. 6 illustrates another example of a method 600 for integrating a resource at a first adapter, various changes may be made to FIG. 6. For example, while FIG. 6 assumes that a server 302 and a gateway 304 are collectively used to integrate a resource 306, the functionality described with respect to gateway 304 could be implemented in server 302.

FIG. 7 illustrates another example method 700 for integrating a resource at a second adapter. Method 700 may be described with respect to gateway 304 of FIG. 3. Method 700 could also be used by another device or devices in another system.

Gateway 304 receives a second script 352 from server 302 at step 702. This may include, for example, adapter module 326 receiving the second script 352 from adapter module 324. Gateway 304 compiles/interprets the second script 352 at step 704. This may include, for example, adapter module 326 interpreting a JYTHON script 352 into JAVA byte codes. Gateway 304 receives an instruction to invoke the second script 352 at step 706. Gateway 304 invokes the second script 352 at step 708. This may include, for example, adapter module 326 executing the JAVA byte codes generated at step 704. At this point, adapter module 326 may be executing script 352, and adapter module 324 in server 302 may be executing script 350. The executing scripts 350, 352 may exchange information to act as an adapter to integrate a resource 306.

Although FIG. 7 illustrates another example of a method 700 for integrating a resource at a second adapter, various changes may be made to FIG. 7. For example, while FIG. 7 assumes that a server 302 and a gateway 304 are collectively used to integrate a resource 306, the functionality described with respect to gateway 304 could be implemented in server 302.

FIG. 8 illustrates an example method 800 for persisting scripts in a database. Method 800 may be described with respect to server 202 of FIG. 2. Method 800 could also be used by another device or devices in another system. For example, method 800 could be used by server 302 to persist scripts in a database.

Server 202 compares a current script to a previously compiled or interpreted script at step 802. This may include, for example, adapter module 224 comparing a marker 278 associated with the binary version of a script 250 with a marker 280 associated with the source version of the script 250. Server 202 determines whether the compared scripts match at step 804. This may include, for example, adapter module 224 determining whether the markers 278, 280 contain the same date-time stamp.

If the markers 278, 280 match, the current script may not have changed since that script was compiled/interpreted earlier. Server 202 may retrieve the binary version of the script at step 806. This may include, for example, adapter module 224 retrieving the binary version of the script 250 from a cache 274. At this point, server 202 may use and process the binary version of the script 250.

If the markers 278, 280 do not match at step 804, the current script has changed since that script was compiled/interpreted. Server 202 compiles/interprets the newer script at step 808. This may include, for example, adapter module 224 generating JAVA byte codes. Server 202 stores the binary version of the newer script at step 810. This may include, for example, adapter module 224 replacing the older binary version of script 250 in cache 274 with the newer binary version generated at step 808. At this point, cache 274 contains an updated version of the script 250.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for integrating a resource in a network, comprising:
   receiving from a requesting entity a first command at a first adapter of a resource integration system, the first command associated with a function to be performed by a resource;
   communicating a second command from the first adapter to a second adapter of the resource integration system, the second command operable to cause the second adapter to retrieve from memory a first script associated with the first command;
   the first adaptor receiving the first script from the second adapter;
   the first adaptor comparing a timestamp associated with the first script to a timestamp associated with a second script;
   the first adaptor interpreting the first script into one or more first byte codes when the timestamps are different;
   the first adaptor communicating a third command to the second adapter, the third command operable to cause the second adapter to retrieve a third script from memory, the second adapter operable to interpret the third script into one or more second byte codes;
   the first adaptor executing at least one of the one or more first byte codes and one or more third byte codes associated with the second script; and
   the first adaptor communicating a fourth command to the second adapter, the fourth command operable to invoke execution of the one or more third byte codes at the second adapter, the execution of the byte codes at the first and second adapters operable to invoke the function in and facilitate communication with the resource.

2. A method for integrating a resource in a network, comprising:
   receiving from a requesting entity a first command at a first adapter of a resource integration system, the first command associated with a function to be performed by a resource communicatively coupled to the resource integration system;
   the first adaptor retrieving a first script from memory;
   the first adaptor comparing a timestamp associated with the first script to a timestamp associated with a second script;
   the first adaptor interpreting the first script into one or more first byte codes when the timestamps are different;
   the first adaptor retrieving a third script from memory;
   the first adaptor communicating the third script to a second adapter of the resource integration system, the second adapter operable to interpret the third script into one or more second byte codes;
   executing at the first adapter at least one of the one or more first byte codes and one or more third byte codes associated with the second script; and the first adaptor communicating a second command to the second adapter, the second command operable to invoke execution of the one or more third byte codes at the second adapter, the execution of the byte codes at the first and second adapters operable to invoke the function in and facilitate communication with the resource.

3. A method for integrating a resource in a network, comprising:
   a first adapter of a resource integration system receiving from a requesting entity a command associated with a function to be performed by a resource communicatively coupled to the resource integration system;
   the first adaptor receiving from memory a first script associated with the command;
   the first adaptor interpreting the first script to produce one or more first byte codes;
   the first adaptor causing a second adapter of the resource integration system to receive a second script from memory, the second adapter operable to interpret the second script into one or more second byte codes;
   the first adaptor executing the one or more first byte codes; and
   the first adaptor invoking execution of the one or more second byte codes at the second adapter, the execution of the byte codes at the first and second adapters operable to invoke the function in and facilitate communication with the resource.

4. The method of claim 3, wherein the first adaptor receiving the first script from memory comprises:
   the first adaptor communicating a second command to the second adapter, the second command operable to cause the second adapter to retrieve the first script from memory; and
   the first adaptor receiving the first script from the second adapter.

5. The method of claim 3, wherein the first adaptor receiving the first script from memory comprises the first adaptor retrieving the first script from a repository.

6. The method of claim 3, further comprising the first adaptor comparing a timestamp associated with the first script to a timestamp associated with a third script received from memory.

7. The method of claim 6, wherein:
   interpreting the first script comprises interpreting the first script to produce the one or more first byte codes when the timestamps are different; and
   executing the one or more first byte codes comprises executing the one or more first byte codes when the timestamps are different.

8. The method of claim 6, further comprising:
   the first adaptor retrieving one or more third byte codes associated with the third script; and
   the first adaptor executing the one or more third byte codes when the timestamps are identical.

9. The method of claim 3, wherein:
   the first adapter operates inside a JAVA container; and
   the second adapter does not operate inside a JAVA container.

10. The method of claim 9, wherein causing the second adapter to receive the second script from memory comprises instructing the second adapter to retrieve the second script from memory using at least one of the following: JAVA Message Service (JMS), Remote Method Invocation (RMI), and JAVA Data Base Connection (JDBC).

11. The method of claim 3, wherein the first adaptor causing the second adapter to receive the second script from memory comprises:
   the first adaptor retrieving the second script from a repository; and
   the first adaptor communicating the second script to the second adapter.

12. The method of claim 3, further comprising executing a third script at the first adapter, wherein execution of the third script requires no interaction with the second adapter.

13. The method of claim 3, wherein:
   the first script comprises a JYTHON script; and
   the one or more first byte codes comprise JAVA byte codes.

14. The method of claim 3, wherein:
   the resource comprises a file directory; and
   the function to be performed comprises at least one of a read function and a write function.

15. A system for integrating a resource in a network, comprising:
   at least one processor operable to execute a first adapter of a resource integration system, the first adapter operable to:
      receive from a requesting entity a command associated with a function to be performed by a resource communicatively coupled to the resource integration system;
      receive a first script from memory;
      interpret the first script to produce one or more first byte codes;
      cause a second adapter of the resource integration system to receive a second script from memory, the second adapter operable to interpret the second script into one or more second byte codes; and
      execute the one or more first byte codes, the execution of the one or more first byte codes operable to invoke execution of the one or more second byte codes at the second adapter, the execution of the byte codes at the first and second adapters operable to invoke the function in and facilitate communication with the resource; and
   at least one memory operable to store the one or more first byte codes.

16. The system of claim 15, wherein the at least one processor is also operable to execute the second adapter.

17. The system of claim 15, wherein the at least one processor is operable to cause the first adapter to receive the first script from memory by:
   communicating a second command from the first adapter to the second adapter, the second command operable to cause the second adapter to retrieve the first script from memory; and
   receiving the first script from the second adapter at the first adapter.

18. The system of claim 15, wherein the at least one processor is operable to cause the first adapter to receive the first script by causing the first adapter to retrieve the first script from the memory.

19. The system of claim 15, wherein:
   the at least one processor is further operable to cause the first adapter to:
      compare a timestamp associated with the first script to a timestamp associated with a third script;
      retrieve from memory one or more third byte codes associated with the third script; and
      execute the one or more third byte codes when the timestamps are identical;

the at least one processor is operable to interpret the first script to produce the one or more first byte codes and further operable to execute the one or more first byte codes when the timestamps are different.

20. The system of claim 15, wherein:
the first adapter operates inside a JAVA container; and
the second adapter does not operate inside a JAVA container.

21. The system of claim 15, wherein the at least one processor is operable to cause the second adapter to receive the second script from memory by instructing the second adapter to retrieve the second script from memory using at least one of the following: JAVA Message Service JMS Remote Method Invocation (RMI), and JAVA Data Base Connection JDBC.

22. The system of claim 15, wherein the at least one processor is operable to cause the second adapter to receive the second script from memory by:
causing the first adapter to retrieve the second script from the memory; and
causing the first adapter to communicate the second script to the second adapter.

23. The system of claim 15, wherein the at least one processor is further operable to execute a third script at the first adapter, wherein execution of the third script requires no interaction with the second adapter.

24. The system of claim 15, wherein:
the at least one memory and the at least one processor form a portion of a first computing device; and
the second adapter is executed by a second computing device.

25. A system for integrating a resource in a network, comprising:
logic embodied on at least one memory device; and
the logic operable when executed to cause a first adaptor of a resource integration system to:
receive from a requesting entity a command associated with a function to be performed by a resource communicatively coupled to a resource integration system;
receive from one of (a) memory and (b) a second adaptor of the resource integration system a first script associated with the command;
interpret the first script to produce one or more first byte codes;
execute the one or more first byte codes; and
invoke execution of one or more second byte codes at the second adapter, the execution of the first and second byte codes operable to invoke the function in and facilitate communication with the resource.

26. A method for integrating a resource in a network, comprising:
receiving a first script at a first adapter of a resource integration system from one of (a) memory and (b) a second adaptor of the resource integration system, the first script associated with a function to be performed by a resource;
the first adaptor interpreting the first script to produce one or more first byte codes;
the first adaptor receiving a command from the second adapter to invoke execution of the one or more first byte codes, the second adapter operable to receive a second script from memory, interpret the second script into one or more second byte codes, and execute the one or more second byte codes; and
the first adaptor executing the one or more first byte codes in response to the execution of the one or more second byte codes at the second adapter, the execution of the byte codes at the first and second adapters operable to invoke the function in and facilitate communication with the resource.

27. The method of claim 26, wherein receiving the first script from memory comprises retrieving the first script from a directory associated with the resource integration system in response to a second command from the second adapter.

28. The method of claim 26, further comprising:
retrieving the second script from a directory associated with the resource integration system in response to a second command from the second adapter; and
communicating the second script to the second adapter.

29. The method of claim 28, wherein communicating the second script to the second adapter comprises communicating the second script to the second adapter using at least one of the following: JAVA Message Service (JMS), Remote Method Invocation (RMI), and JAVA Data Base Connection (JDBC).

30. The method of claim 26, wherein:
the first adapter does not operate inside a JAVA container; and
the second adapter operates inside a JAVA container.

31. A system for integrating a resource in a network, comprising:
at least one processor operable to execute a first adapter of a resource integration system, the first adapter operable to:
receive a first script from memory, the first script associated with a function to be performed by a resource communicatively coupled to the resource integration system;
interpret the first script to produce one or more first byte codes;
receive a command from a second adapter of the resource integration system to invoke execution of the one or more first byte codes, the second adapter operable to receive a second script from memory, interpret the second script into one or more second byte codes, and execute the one or more second byte codes; and
execute the one or more first byte codes in response to the execution of the one or more second byte codes at the second adapter, the execution of the byte codes at the first and second adapters operable to invoke the function in and facilitate communication with the resource; and
at least one memory operable to store the one or more first byte codes.

32. The system of claim 31, wherein the at least one processor is operable to receive the first script by retrieving the first script from the memory in response to a second command from the second adapter.

33. The system of claim 31, wherein the at least one processor is operable to receive the first script by receiving the first script from the second adapter.

34. The system of claim 31, wherein the at least one processor is further operable to:
retrieve the second script from the memory in response to a second command from the second adapter; and
communicate the second script to the second adapter.

35. The system of claim 34, wherein the at least one processor is operable to communicate the second script to the second adapter using at least one of the following: JAVA Message Service (JMS), Remote Method Invocation (RMI), and JAVA Data Base Connection (JDBC).

36. The system of claim 31, wherein:
the at least one memory and the at least one processor form a portion of a first computing device; and
the second adapter is executed by a second computing device.

37. The system of claim 31, wherein:
the first adapter does not operate inside a JAVA container; and
the second adapter operates inside a JAVA container.

38. A system for integrating a resource in a network, comprising:
logic embodied on at least one memory device; and
the logic operable when executed to cause a first adaptor of a resource integration system to:
receive a first script from storage, the first script associated with a function to be performed by a resource communicatively coupled to the resource integration system;
interpret the first script to produce one or more first byte codes;
receive a command from a second adapter of the resource integration system to invoke execution of the one or more first byte codes, the second adapter operable to receive a second script from memory, interpret the second script into one or more second byte codes, and execute the one or more second byte codes; and
execute the one or more first byte codes in response to the execution of the one or more second byte codes at the second adapter, the execution of the byte codes at the first and second adapters operable to invoke the function in and facilitate communication with the resource.

39. A system for integrating a resource in a network, comprising:
at least one memory operable to store a first script and a second script;
a first adapter of a resource integration system operable to receive a command associated with a function to be performed by a resource communicatively coupled to the resource integration system, receive the first script from the memory, interpret the first script to produce one or more first byte codes, and execute the one or more first byte codes;
a second adapter of the resource integration system operable to receive the second script from the memory, interpret the second script into one or more second byte codes, and execute the one or more second byte codes in response to the execution of the one or more first byte codes at the first adapter; and
wherein the execution of the byte codes at the first and second adapters is operable to invoke the function in and facilitate communication with the resource.

* * * * *

UNITED STATES PATENT AND TRADEMARK OFFICE
CERTIFICATE OF CORRECTION

| | | |
|---|---|---|
| PATENT NO. | : 7,171,650 B2 | Page 1 of 1 |
| APPLICATION NO. | : 10/226863 | |
| DATED | : January 30, 2007 | |
| INVENTOR(S) | : Charles S. Fenton and Ryan P. Harris | |

It is certified that error appears in the above-identified patent and that said Letters Patent is hereby corrected as shown below:

Col 13, In the Claims 21. should read --The system of claim 15, wherein the at least one processor is operable to cause the second adapter to receive the second script from memory by instructing the second adapter to retrieve the second script from memory using at least one of the following: JAVA Message Service ~~JMS~~ (JMS), Remote Method Invocation (RMI), and JAVA Data Base Connection ~~JDBC~~ (JDBC).

Signed and Sealed this

Twenty-third Day of October, 2007

JON W. DUDAS
*Director of the United States Patent and Trademark Office*